(12) United States Patent
Wechner

(10) Patent No.: US 6,170,848 B1
(45) Date of Patent: Jan. 9, 2001

(54) SYSTEM AND RELATED METHOD FOR STEERING AN ARTICULATED TRAIN

(75) Inventor: Edward Wechner, Minnamurra (AU)

(73) Assignee: Joy MM Delaware, Inc., Wilmington, DE (US)

(*) Notice: Under 35 U.S.C. 154(b), the term of this patent shall be extended for 0 days.

(21) Appl. No.: 09/219,139

(22) Filed: Dec. 22, 1998

(51) Int. Cl.[7] .................................................. B60D 1/24
(52) U.S. Cl. ...................... 280/411.1; 280/442; 280/419; 180/418
(58) Field of Search ............................... 280/410, 411.1, 280/408, 426, 442, 463; 180/418, 420, 14.2

(56) References Cited

U.S. PATENT DOCUMENTS

| | | | |
|---|---|---|---|
| 3,701,547 | * 10/1972 | Goold | 280/432 |
| 3,903,979 | * 9/1975 | Perrotin | 180/23 |
| 4,153,265 | * 5/1979 | McColl | 280/112 A |
| 4,160,619 | * 7/1979 | Nelson | 414/501 |
| 4,366,966 | * 1/1983 | Ratsko et al. | 280/432 |
| 4,405,143 | * 9/1983 | Rosenkrands | 280/403 |
| 5,067,741 | * 11/1991 | Ayme | 280/419 |
| 5,280,939 | * 1/1994 | Kee et al. | 280/432 |
| 5,301,787 | * 4/1994 | Etherington et al. | 198/303 |
| 5,366,059 | * 11/1994 | Demong | 198/303 |
| 6,016,885 | * 1/2000 | Hickman et al. | 180/418 |

* cited by examiner

Primary Examiner—Brian L. Johnson
Assistant Examiner—Daniel Yeagley
(74) Attorney, Agent, or Firm—James Earl Lowe, Jr.

(57) ABSTRACT

An articulated train such as a coal haulage system includes first, second, third and fourth vehicles pivotally pinned to one another in end-to-end relationship. In the improvement, the train includes a steering system having first mechanism for selectively securing the second and third vehicles in aligned relationship and second mechanism for selectively securing the third and fourth vehicles in aligned relationship. Turn control mechanism unlocks the first mechanism when the first vehicle turns through a predetermined angle. In an exemplary embodiment, each of the first and second mechanism includes an actuator and a hydraulic valve which coacts with such actuator. The steering system locks those vehicles following the first vehicle in an aligned (i.e., nominally straight-line) relationship and, as to any vehicle, such system permits the hydraulic valves of vehicles to be sequentially unlocked and the vehicles to turn only when the vehicle immediately preceding a particular vehicle has turned through a predetermined number of degrees.

17 Claims, 19 Drawing Sheets

FIG. 2

SYSTEM AND RELATED METHOD FOR STEERING AN ARTICULATED TRAIN

FIELD OF THE INVENTION

This invention relates generally to land vehicles and, more particularly, to articulated vehicles and steering of such vehicles.

BACKGROUND OF THE INVENTION

In the case of a rigid-frame vehicle, the techniques used for vehicle steering are straightforward and well-known. No doubt, the most common arrangement is to steer that pair of wheels which, for the usual direction of travel, is forwardmost. The axles of the trailing wheels are fixed with respect to the vehicle body.

Less common but by no means unheard of is an arrangement in which a rigid-frame vehicle has four wheels, two on each of two steerable axles. The wheel pairs are steerable, either in opposite directions or in the same direction. The latter is known as "crab" steering.

Other types of vehicles are articulated; that is, such vehicles have a pair of rigid frames pinned together for relative pivoting movement with respect to one another. Certain types of articulated construction vehicles are configured in this way and use a pair of hydraulic cylinders to apply force to the frames and change the angle of such frames relative to one another.

Another example of an articulated vehicle, commonly known as a "semi," is an over-the-road haulage trailer coupled to a towing tractor. Trailer-tractor "jackknifing" is relatively common and a good deal of creative effort had been directed to arrangements to limit the angle that such trailer and tractor can assume with respect to one another. Examples are disclosed in U.S. Pat. No. 3,701,547 (Goold) and U.S. Pat. No. 4,366,966 (Ratsko et al.).

U.S. Pat. No. 5,244,226 (Bergh) discloses a system for steering the wheels of a towed, two-wheel trailer in response to variations in the angle of articulation between the trailer and the steerable towing vehicle. The system compares the angle of articulation and the angle of the trailer wheels, both as a percent of some maximum (although not necessarily equal) angle. The angle of the trailer wheels is the dependent variable and is changed as a function of the angle of articulation.

None of the foregoing examples contemplate (or seem to contemplate) mobile equipment having several trailer-like vehicles pivotally pinned together to form what might be described as a "train." Mobile equipment of this type is common in underground mines for transporting, i.e., hauling or conveying, the mined product.

Such mining mobile equipment may be characterized in three ways. One is that the number of vehicles pivotally-pinned together may be relatively high, e.g., ten, a dozen or more. Another is that such equipment is routinely moved through relatively narrow, curving tunnels. And another characterization is that the equipment tends to undulate or "concertina" as it is moved along a tunnel. That is, each vehicle does not necessarily faithfully follow the tunnel roadway but, rather, may move from side to side, i.e., transversely with respect to the desired line of travel, as the train of vehicles moves. This makes the equipment more difficult to steer and, in fact, imposes undesirable loads on the towing gear.

And there is another factor which makes vehicle undulation undesirable. In an underground mine, it is common to leave in place a number of vertical columns (sometimes known as pillars) or ribs of the material being mined, e.g., coal. Left-in-place pillars and ribs help support the roof and prevent mine collapse.

An undulating material transport system risks striking one of the columns or ribs and, perhaps, weakening it. As a result, room support is impaired, at least to some degree.

A steering system and method useful on material transport equipment and which address problems and shortcomings of the prior art would be an important technological advance.

OBJECTS OF THE INVENTION

It is an object of the invention to provide an improved steering system for conveyor-like material transport equipment.

Another object of the invention is to provide an improved steering system which helps prevent undulation of material transport equipment operating in a mine tunnel.

Another object of the invention is to provide an improved steering system which helps avoid striking roof-supporting pillars and ribs.

Still another object of the invention is to provide an improved method for steering multi-vehicle, in-line material transport equipment. How these and other objects are accomplished will become apparent from the following descriptions and from the drawings.

SUMMARY OF THE INVENTION

The invention involves an articulated train which, in an exemplary embodiment, is a continuous coal haulage system. Trains of this type have a tendency to "snake" or "undulate" as they travel and the invention substantially prevents such undulation.

In an articulated train, the first vehicle is controllably steered by, e.g., a human operator. The improvement comprises a steering system which locks those vehicles following the first vehicle in an aligned (i.e., nominally straight-line) relationship. As to any vehicle, the system permits such vehicle to be sequentially unlocked and turn only when the vehicle immediately preceding such vehicle has turned through a predetermined number of degrees.

The articulated train includes first, second, third and fourth vehicles pivotally pinned to one another in end-to-end relationship. The steering system includes first means for selectively securing the second and third vehicles in aligned relationship and second means for selectively securing the third and fourth vehicles in aligned relationship. A turn control means, the leading hydraulic valve in an exemplary embodiment, unlocks the first means when the first vehicle turns through a predetermined angle.

The steering system has two closely-similar configurations, both of which involve "sets" of actuators and actuator mechanisms. As to a particular set, the actuator and its actuator mechanism coact with one another.

In the first configuration, the actuator is mounted on the vehicle immediately ahead of the vehicle on which the coacting actuator mechanism is mounted. That is, in a direction of travel, the actuator leads its actuator mechanism. In the second configuration, the actuator mechanism is mounted on the vehicle immediately ahead of the vehicle on which the coacting actuator is mounted. In other words, the actuator trails its actuator mechanism.

In the first configuration of the steering system, the first means includes (a) a first actuator fixed with respect to the second vehicle, and (b) a first actuator mechanism fixed with respect to the third vehicle and coacting with the first actuator. The second means includes (a) a second actuator fixed with respect to the third vehicle, and (b) a second actuator mechanism fixed with respect to the fourth vehicle and coacting with the second actuator.

In the second configuration of the steering system, the first means includes (a) a first actuator mechanism fixed with respect to the second vehicle, and (b) a first actuator fixed with respect to the third vehicle and coacting with the first actuator mechanism. The second means includes (a) a second actuator mechanism fixed with respect to the third vehicle, and (b) a second actuator fixed with respect to the fourth vehicle and coacting with the second actuator mechanism.

In either configuration, the actuator mechanisms have locked and unlocked configurations. And in either configuration, the first means secures the second and third vehicles in aligned relationship when the first actuator mechanism is in its locked configuration. And the first means permits the second vehicle to pivot or turn with respect to the third vehicle when the first actuator mechanism is in its unlocked configuration.

Similarly, the second means secures the third and fourth vehicles in aligned relationship when the second actuator mechanism is in its locked configuration. And the second means permits the third vehicle to turn with respect to the fourth vehicle when the second actuator mechanism is in its unlocked configuration.

In an exemplary embodiment described in detail below, the turn control means is the leading or forward-most hydraulic valve and has two spools protruding in opposite directions from the valve body. Unlike the other hydraulic valves in the system, the spools of the leading, turn-controlling hydraulic valve are never locked in outward positions by high pressure. Rather, such spools are only urged outwardly to lock positions by relatively low hydraulic pressure and are readily pushed inwardly to unlock positions by the actuator coacting with that valve. In an exemplary embodiment, the turn-controlling hydraulic valve unlocks the first means when the first vehicle turns through a predetermined angle.

In an exemplary embodiment, the first actuator mechanism is a hydraulic valve having two spools protruding in opposite directions from the valve body. Such valve has a locked or an unlocked configuration, depending upon the level of hydraulic pressure acting upon the spools and urging them outwardly.

In the exemplary embodiment, the first actuator is a fork having two spaced-apart arms which straddle the valve and coact with the valve spools. Each arm is immediately adjacent to a respective spool and when the spools are high-pressure-retained in outward positions, the arms are prevented from significant lateral movement with respect to the valve. Therefore, the vehicle on which the actuator is mounted (first configuration) or which the valve is mounted (second configuration) is prevented from turning with respect the immediately-following vehicle until the between-spool pressure is reduced to a low value.

For an articulated train which travels in only one direction, either configuration may be used. For such a train which travels in either of two directions, as is the case in an exemplary coal haulage system, the train may be said to have the first configuration in one direction of travel and the second configuration in the other.

The following assumes that the system is of the first configuration and describes events as they occur when the train is turned leftward. Each of the first, second and third valves includes a respective spool mounted for movement between lock and unlock positions. Such spools are on the left sides of their respective valves and are referred to, respectively, as the first, second and third valve spools.

When the first valve spool is in its lock position, the second valve spool is pressure-retained in its lock position. And when the first valve spool is moved to its unlock position by urging of the first actuator, the second valve spool is pressure-relieved to move to its unlock position under the urging of the second actuator.

The third valve also includes a spool mounted for movement between lock and unlock positions. When the second valve spool is moved to its unlock position, the third valve spool is pressure-relieved to move to its unlock position under the urging of the third actuator.

A highly preferred steering system includes a pressure line common to the first, second and third valves and each of the valves includes a respective chamber in pressure communication with its valve spool. When the first valve spool is in its lock position, the chamber of the second valve is connected to the pressure line. A highly preferred steering system also includes a tank line common to the first, second and third valves and when the first valve spool is in its unlock position, the chamber of the second valve is connected to the tank line.

In a more specific aspect of the invention, the second and third valves each include a respective control device. Such devices are embodied as small control spools pressure-biased to a first position and spring-biased to a second position.

When the second valve spool is pressure-retained in its lock position, such pressure retention is by a connection from the pressure line through the control device of the second valve to the chamber of the second valve. Similarly, when the third valve spool is pressure-retained in its lock position, such pressure retention is by a connection from the pressure line through the control device of the third valve to the chamber of the third valve.

For pressure retention of a valve spool, e.g., the second valve spool, in its lock position, the first valve spool is in its lock position and the control device of the second valve is in its first position. And when the first valve spool is in its unlock position, the control device of the second valve is in its second or spring-biased position and the second valve spool is pressure-relieved to move to its unlock position under the urging of the second actuator.

Another aspect of the invention involves a method for steering the articulated train equipped with the valves and actuators fixed relative to particular vehicles, all as described above. From assumed straight-line travel, the first vehicle is steered into a turn and when the long axis of the first vehicle has attained some predetermined angle with respect to that of the second vehicle, e.g., 8°, the first actuator is urged against the first valve spool, thereby moving such first valve spool to its unlock position. When the first valve spool is in its unlock position, the second valve spool is pressure-relieved.

More specifically, the second valve includes a control device mounted for movement between a first pressure-biased position and a second spring-biased position. The pressure-relieving step includes moving the control device to the second spring-biased position.

The following aspects of the invention relate to the second configuration of the train as described above. In such second configuration, the first, second and third hydraulic valves are fixed with respect to the first, second and third vehicles, respectively. And the first, second and third actuators are fixed with respect to the second, third and fourth vehicles, respectively. But for these differences, the respective valves are identical and operate in the same way as described above. In a method for steering an articulated train involving the second configuration, the steps are the same as those described above.

Further details of the invention are set forth in the following detailed description and in the drawings.

BRIEF DESCRIPTION OF THE DRAWINGS

FIG. 2 is a representative top plan view of a first configuration of the train shown in FIG. 1. The conveyor belt has been omitted for clarity.

DETAILED DESCRIPTIONS OF PREFERRED EMBODIMENTS

The objects of the invention are achieved by a steering system which, in the preferred embodiment, uses fork-like actuators, one fixed to each of several vehicles used to make up an articulated train. The motion of each actuator (and, therefore, of the vehicle to which the actuator is rigidly attached) is restrained by pressure in respective hydraulic valves. A vehicle is not permitted to turn significantly until hydraulic pressure in the relevant valve is relieved.

A brief example is used to introduce how the system operates. It is assumed that each of the first three vehicles in the train has an actuator affixed to it and that the second and third vehicles have hydraulic valves mounted on them. The actuator on the rear end of the first vehicle coacts with the valve on the head end of the second vehicle and the actuator on the rear end of the second vehicle coacts with the valve on the head end of the third vehicle. While the outwardly-protruding spools of the valve on the third vehicle are selectively restrained in their outward or lock positions by elevated hydraulic pressure, the spools of the valve on the second vehicle are only urged to their outward positions by relatively-low pressure.

As the first vehicle is steered into a turn, its actuator urges one of the spools on the second vehicle inward to an unlock position. This changes the configuration of the hydraulic flow paths and the pressure restraining the spools of the valve on the third vehicle is thereby substantially reduced and such spools are "unlocked." Therefore, the actuator on the second vehicle is free to pivot with respect to the third vehicle. This permits the second vehicle to turn with respect to the third vehicle as the second vehicle follows the first. As spools of successive valves are unlocked in sequence, each vehicle turns at about the same location on the path being travelled. That is, significant undulating movement of the vehicles is prevented.

Figure 1:
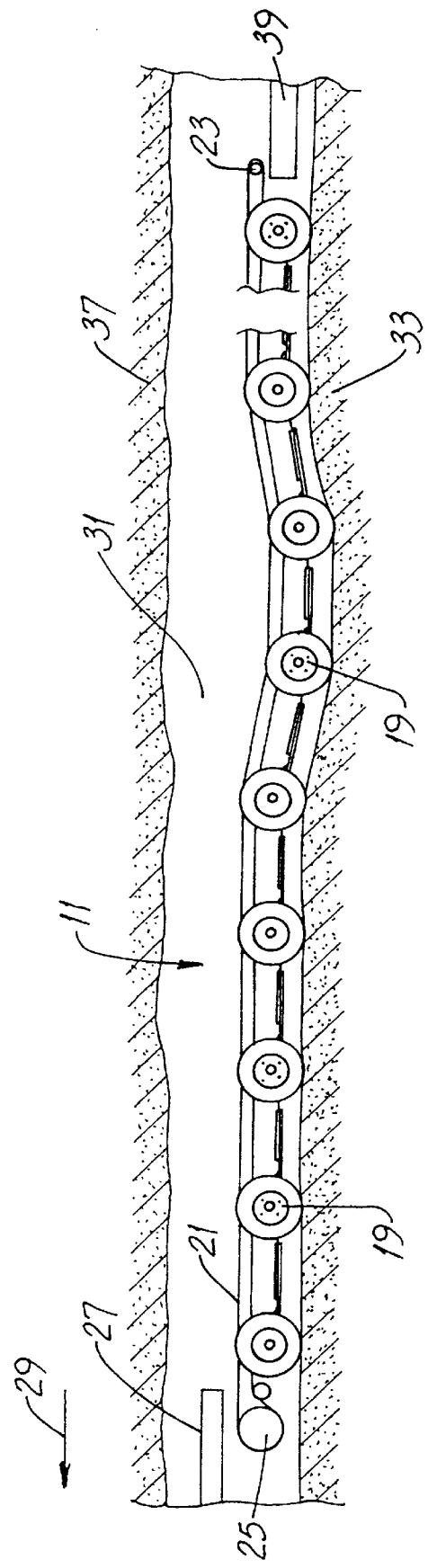
FIG. 1 is a representative elevation view of a coal-hauling articulated train in an underground mine.
Figure 2:
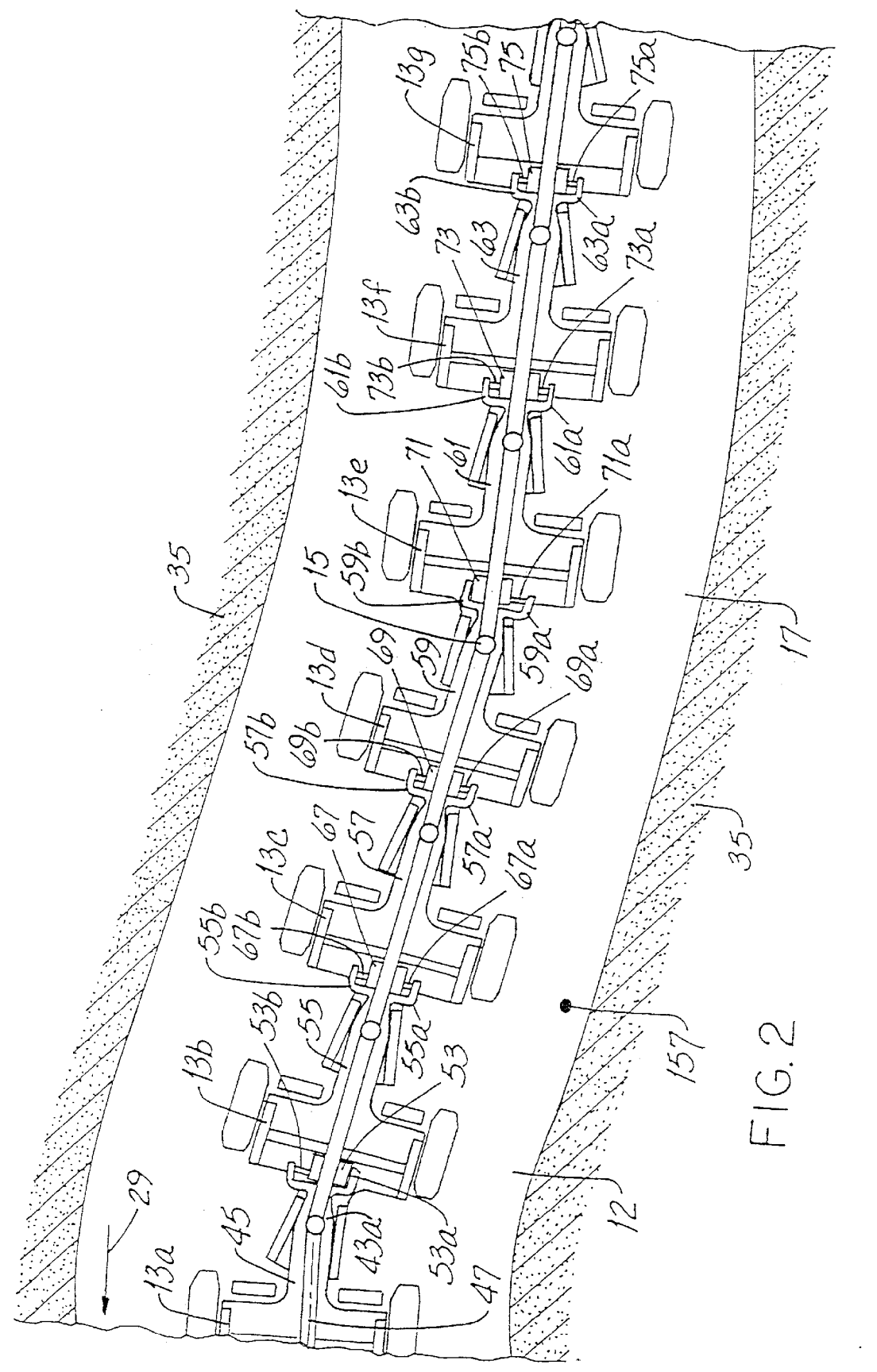
Figure 3:
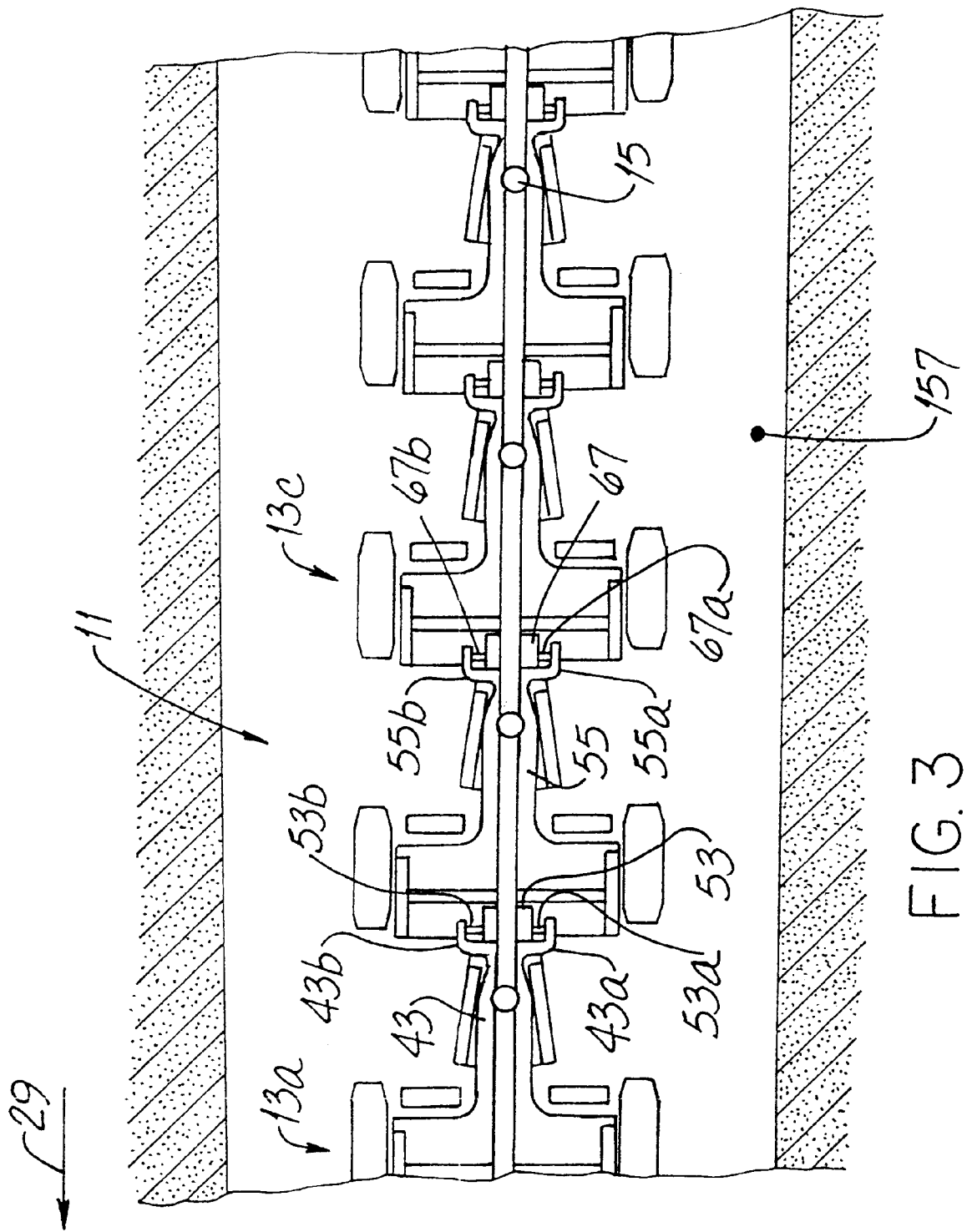
FIG. 3 is a representative top plan view, generally like that of FIG. 2, showing the train moving along a straight path. The conveyor belt has been omitted for clarity.

Before describing the articulated train steering system 10 and related method, it will be helpful to have an understanding of how the train 11 is constructed and used. Referring to FIGS. 1, 2 and 3, the train 11 includes a plurality of two-wheeled cart-like vehicles 13 (numbered 13a, 13b and so forth, in sequence) pinned to one another in end-to-end relationship to pivot about axes 15 as the train 11 moves along a curved path 17. Selected vehicles 13 have powered wheels 19 for train movement but in other embodiments, the train 11 may be pulled by a powered vehicle such as the mining machine 27. The vehicles 13 support a continuous elastomeric belt 21 which is powered by one or more drive pulleys 23 and which, therefore, is capable of movement with respect to the vehicles 13. An idler pulley 25 is at the other end of the belt 21.

For a train configured to travel in only one direction, the vehicle 13 at the lead end of the train 11 has steerable wheels. Such vehicle 13 may be steered by manual or remote control or otherwise. On the other hand, none of the vehicles 13 need have steerable wheels if the train 11 is steering by coupling it to a mining machine 27. It is to be appreciated that the train 11 may be constructed so that the vehicles 13 at each end of the train 11 are steerable and that the train 11 is capable of movement in either direction. And the belt 21 and its pulleys 23, 25 may be constructed and powered to move coal in either direction with respect to the vehicles 13. In an exemplary operation, the train 11 is behind and moves with the underground continuous mining machine 27 although, in one embodiment, it is not attached to such machine 27. In FIGS. 1 and 2, the direction of travel is indicated by the arrow 29. As the machine 27 advances, it cuts a tunnel 31 in a seam of coal 33 but does not cut away ribs of unmined coal 35 which are left in place to help support the roof 37. The coal removed from the seam 33 is transported by the train 11 to the main conveyor belt 39 and thence out of the mine.

As illustrated by the curved path 17 (FIG. 2), the advancing machine 27 often does not travel in a straight line. As explained above, it is highly preferred that the vehicles 13 be prevented from moving side-to-side so that the train 11 faithfully follows the curved path 17. The steering system 10, described below, includes actuators and hydraulic valves, the latter connected together in the circuit 41 of FIGS. 4A and 4B. The aforedescribed result is automatically achieved by using elevated hydraulic pressure to hold valve spools in lock positions (and thereby restrain actuator pivoting) and sequentially reducing such pressure to permit sequential vehicle and actuator pivoting.

Figure 6:
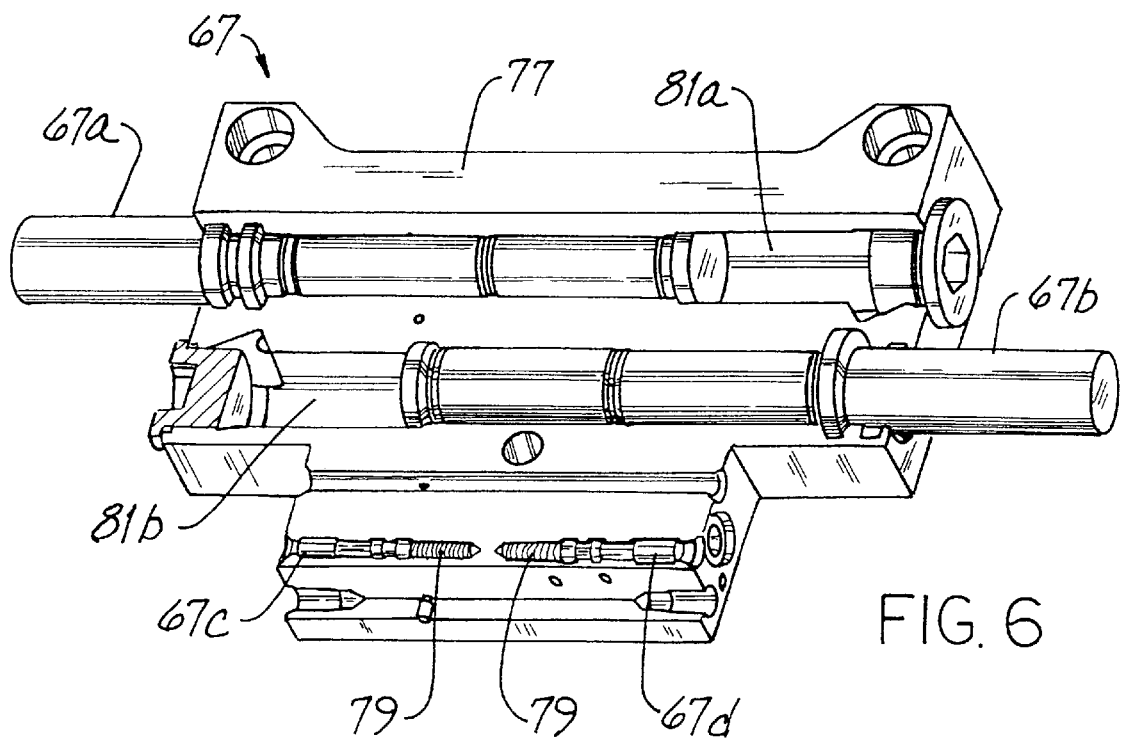
FIG. 6 is a cutaway perspective view of an exemplary hydraulic valve of the type used in the hydraulic circuit of FIGS. 4A, 4B.
Figure 5:
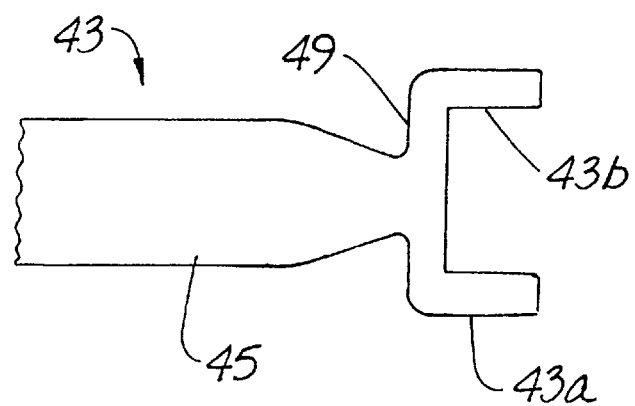
FIG. 5 is a representative top plan view of an actuator of the type used in the steering system. Parts are broken away.

Referring particularly to FIGS. 2, 5 and 6, in a first configuration, the train 11 has first, second, third, fourth, fifth, sixth and trailing vehicles 13a, 13b, 13c, 13d, 13e, 13f, 13g, respectively. It is also to be understood that such train may have one or more additional nth vehicles 13. The assumed direction of travel of the train is indicated by the arrow 29.

A first actuator 43 is fixed with respect to the first vehicle 13a. That is, the positional relationship of the actuator 43 with respect to the vehicle carriage does not change. In an exemplary embodiment, the actuator 43 includes a support bar 45 which is always in registry with the long axis 47 of the vehicle 13a. A fork 49 is mounted to the bar 45 and includes two spaced-apart arms 43a, 43b which, as described below, coact with spools 53a, 53b of the first valve 53. (For reasons that will become apparent, the valve 53 controls the way in which the train and its vehicles turn.) In a specific embodiment, the arms 43a, 43b are spaced equidistant from the long axis 47.

Similarly, the vehicles 13b, 13c, 13d, 13e, 13f, include second, third, fourth, fifth and sixth actuators 55, 57, 59, 61, 63, respectively. Such actuators 55, 57, 59, 61, 63 are also fixed with respect to the vehicles 13b, 13c, 13d, 13e, 13f, respectively.

When considering the hydraulic circuits of FIGS. 4A, 4B and 7 through 18, some rules of interpretation will be helpful. Hydraulic lines which cross are assumed not to be connected to one another unless an enlarged "node" or dot is placed at the cross. Hydraulic lines which define a "T" intersection are assumed to be connected to one another, even though no node is placed at the intersection.

Figure 7:
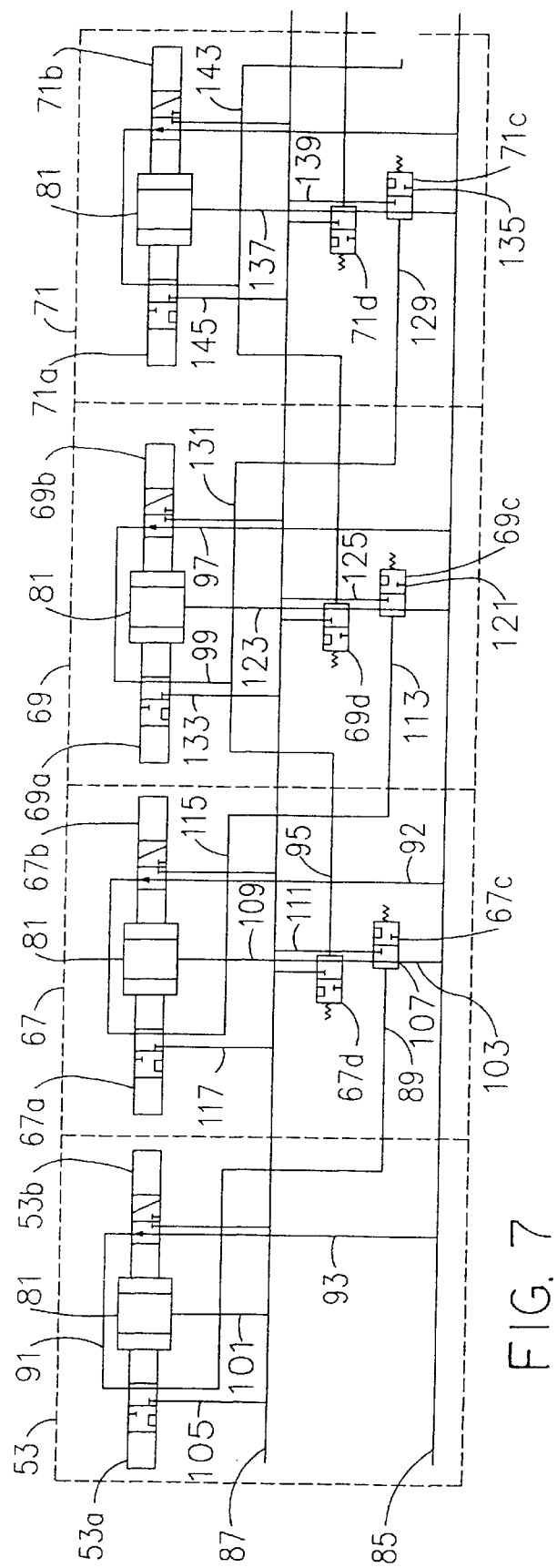
FIGS. 7 through 18 show portions of the circuit of FIGS. 4A and 4B during a sequence of operating conditions.

Inherently, any hydraulic valve has an element, movement of which establishes different flow paths. Each of the spools of all of the valves 53, 67, 69, 71, 73, 75 is a two-position spool. Considering FIGS. 7 and 8 and valve 53 as an example, spool 53a has two possible positions. The flow paths established by each are represented by horizontally adjacent boxes or "envelopes." When interpreting hydraulic diagrams such as those of FIGS. 7 and 8, it is assumed that the hydraulic lines or paths, e.g., paths 89, 91, 105 are positionally fixed and the envelopes move with respect to such paths. For example, when the spool 53a is in its outward or "leftmost" position as shown in FIG. 7, the righthand envelope is in and establishes the circuit. When spool 53a is in such position, paths 89 and 91 are connected to one another and path 105 is blocked as represented by the T-symbol. When the spool 53a is in its inward or rightmost position, the lefthand envelope is in and establishes the circuit. When spool 53a is in such position, paths 89 and 105 are connected to one another and path 91 is blocked as represented by the inverted T-symbol.

Figures 4A, 4B:
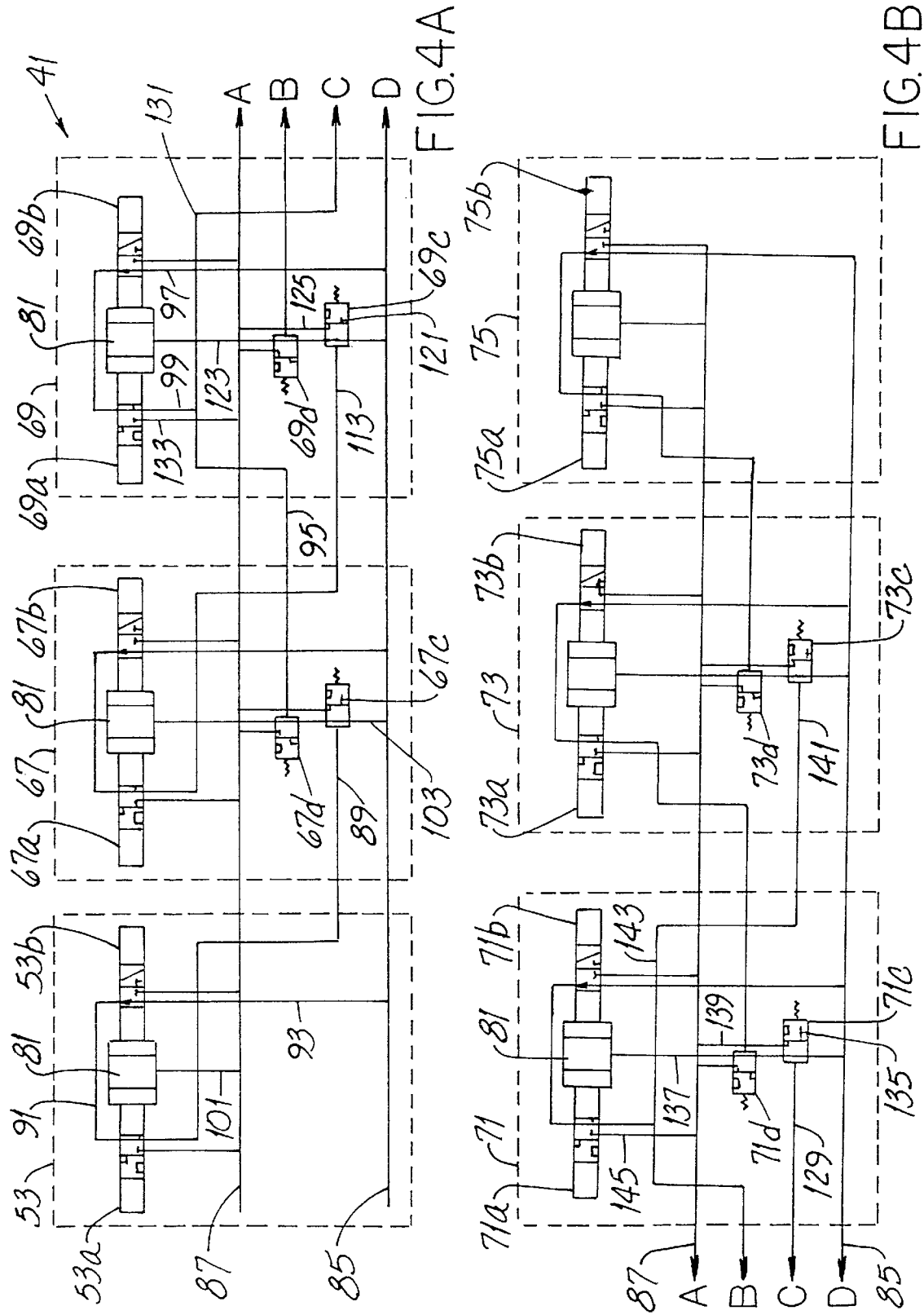
FIGS. 4A and 4B, taken together at the match lines A, B, C, D, is a schematic diagram of a hydraulic circuit used in the new steering system.

Referring also to FIGS. 2, 4A and 4B, first, second, third, fourth, fifth and sixth hydraulic valves 53, 67, 69, 71, 73, 75, respectively, are fixed with respect to the second, third, fourth, fifth and trailing vehicles 13b, 13c, 13d, 13e, 13f, 13g, respectively. Each valve 53, 67, 69, 71, 73, 75 has a valve body 77 and a pair of spools mounted for movement with respect to the body 77.

The left and right spools of a particular valve are identified by the numeral for that valve followed by the suffix "a" or "b," respectively. Specifically, the left and right spools of valve 53 are identified by 53a, 53b, respectively, the left and right spools of valve 67 are identified by 67a, 67b, respectively, the left and right spools of valve 69 are identified by 69a, 69b, respectively, the left and right spools of valve 71 are identified by 71a, 71b, respectively, the left and right spools of valve 73 are identified by 73a, 73b, respectively, and the left and right spools of valve 75 are identified by 75a, 75b, respectively. Spools are referred to as left and right spools as such spools would be positioned to a viewer of FIG. 2 looking in the direction of travel indicated by the arrow 29.

Referring particularly to FIGS. 4A, 4B and 6 and using valve 67 as an example in FIG. 6, valve 67 also includes first and second control devices 67c, 67d, respectively, which are embodied as exemplary small control spools biased by pressure to a first position and by a spring 79 to a second position. Such control devices 67c, 67d as well as other control devices of the devices 69c, 69d, 71c, 71d and 73c, 73d and their associated springs 79 are configured in such a way that the force of a spring 79 is less than the force resulting when the device is connected to the pressure line 85 and greater than the force resulting when the device is connected to the tank line 87.

While the valve 67 could be constructed so that the spools 67a, 67b are coaxial and have but a single chamber between them, a more compact valve has its spools 67a, 67b offset. Physically there are two chambers 81a, 81b one for each spool 67a, 67b, but in the preferred embodiment, such chambers 81a, 81b, are connected together by a passage (not shown) in the body 77. In this specification, the chambers 81a, 81b are considered to be a single chamber 81 as, indeed, they are when considered from an hydraulic function standpoint.

Considering FIG. 3 and using actuators 43, 55 and the valves 53, 67 associated respectively with them, from an inspection of the relative positions of different actuator arms 43a, 43b and valves 53, 67 and spools 53a, 53b, 67a, 67b , it is apparent that actuator 43 and its arms 43a, 43b and the associated valve 53 and its spools 53a, 53b are arranged in such a way that both spools 53a, 53b extend outwardly when the train 11 is travelling in a straight line. That is, neither arm 43a, 43b urges its associated spool 53a, 53b inwardly and such spools 53a, 53b remain in what are described as their lock positions. Such lock positions are also shown in FIG. 4A. Arrangement is also such that as a vehicle 13 turns through a predetermined number of degrees, one or the other of the arms 43a, 43b urges its associated spool 53a, 53b inwardly toward what is described as an unlock position.

The terms "lock position" and "unlock position" refer to the effect of a spool on the next valve downstream. For example, when spool 53a is in its unlock position, the effect is to reduce the pressure in chamber 81 between spools 67a, 67b of the valve 67, thereby "unlocking" such spools 67a, 67b. This permits the actuator 55 to urge one or the other of such spools inwardly during a turn.

The operation of the first configuration of the train 11, shown in FIGS. 2 and 3, will be described for a particular direction of travel, for a particular direction of turning and for resumption of straight travel after turning. After appreciating that description, persons of ordinary skill in the art will understand how such configuration operates for the other direction of turning. Following this description is a description of aspects of the second configuration.

Briefly described, the purpose of the hydraulic circuit 41 is to help assure that a vehicle such as vehicle 13c (to which actuator 57 is affixed) is restrained from turning until the vehicle 13c reaches the proper point along the path 17. Such restraint is by using pressurized spools 69a, 69b to hydraulically restrain movement of the actuator 57 until the proper point is reached. Thereupon, the pressure which holds spools 69a, 69b outwardly (and thereby prevents lateral, turning movement of the actuator 57) is relieved and as the vehicle 13c enters the turn, the actuator 57 is permitted to move with respect to the valve 69.

Referring now to FIGS. 2, 3, 4A, 4B, 6 and, particularly, to FIG. 7, the hydraulic circuit 41 of the steering system 10 includes pressure and tank lines 85, 87, respectively, which are common to all of the valves 53, 67, 69, 71, 73, 75. It is assumed that the train 11 is travelling in a straight line as shown in FIG. 3 and that the spools of the valves 53, 67, 69, 71, 73, 75 are in their respective lock positions shown in FIGS. 4A, 4B. Particularly noting the valve 53 and its spools 53a, 53b, the valve 67 and its spools 67a, 67b and the valve 69 and its spools 69a, 69b, the pressure line 85 is connected to the control line 89 through the paths 93 and 91. The pressure line 85 is also connected to the control line 95 through the paths 97 and 99. As a result, the first and second control devices 67c, 67d, of the valve 67 are pressure-biased to their respective first positions as shown.

It is also to be noted that the chamber 81 between the spools 53a, 53b, of the valve 53 is connected to the tank line 87 along the path 101. Therefore, the chamber 81 is at relatively low tank pressure.

For a particular valve configuration, tank pressure in the range of 70–75 p.s.i. (about 5 bar) is adequate to provide about 50–55 pounds (about 24 kg) force on the spools 53a, 53b to urge such spools outwardly and maintain them there in the absence of actuator force. And a pressure in the pressure line 85 in the range of 3000 p.s.i. to 6000 p.s.i. (about 180 to 360 bar) is sufficient to restrain actuator movement and prevent vehicle undulation. (Of course, the pressure in line 85 is selected depending upon particular valve configuration and the level of turn-resisting force desired.)

With the control devices 67c, 67d of the valve 67 in their respective first or lock positions, the chamber 81 between the left and right spools 67a, 67b, of the valve 67 is pressurized via the path 103. Therefore, the spools 67a, 67b are retained in their outwardly extended lock positions by the pressure in the pressure line 85. The vehicle 13c is thereby prevented from making more than nominal angular movement with respect to the actuator 55.

It is now assumed that the first vehicle 13a enters a left turn as shown in FIG. 2. As it does so, the actuator 43 urges the left spool 53a of the valve 53 inwardly, i.e., rightwardly (against low tank pressure consistently prevailing in the chamber 81 of valve 53) to the unlock position shown in FIG. 8. In such unlock position, the line 89 to the first control device 67c is connected to the tank line 87 via the path 105.

Figure 9:
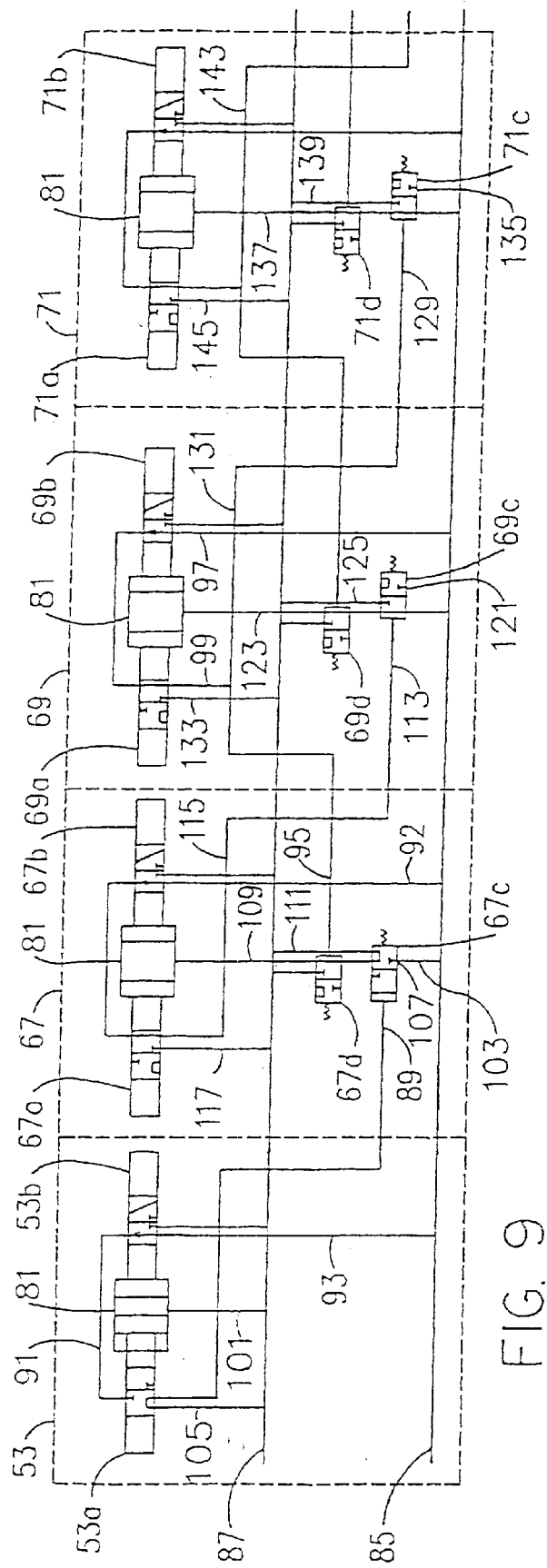

No longer pressure-biased to the position shown in FIG. 7, the control device 67c is biased by its spring 79 to the position shown in FIG. 9. When the device 67c is in such position, the path from the pressure line 85 is blocked at the port 107 and the chamber 81 of the valve 67 is connected to the low-pressure tank line 87 via the paths 109, 111. While the spools 67a, 67b of the valve 67 are still in their lock positions, they are now held there only by low tank pressure and both are free to be urged to an unlock position by the actuator 55.

Figure 10:
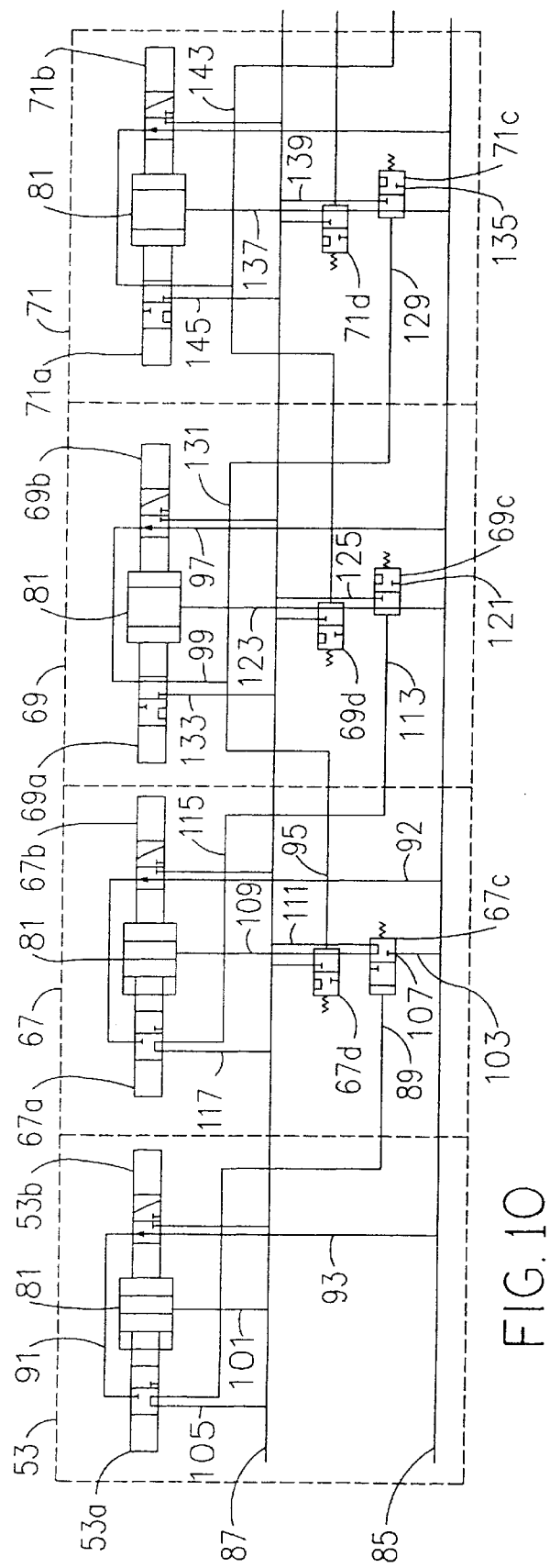

As the train 11 continues along the curved path, the second vehicle 13b enters the left turn and the actuator arm 55a urges the left spool 67a of the valve 67 rightwardly to its unlock position as shown in FIG. 10. Therefore, the line 113 to the first control device 69c of the valve 69 is connected to the tank line 87 via the paths 115 and 117.

Figure 11:
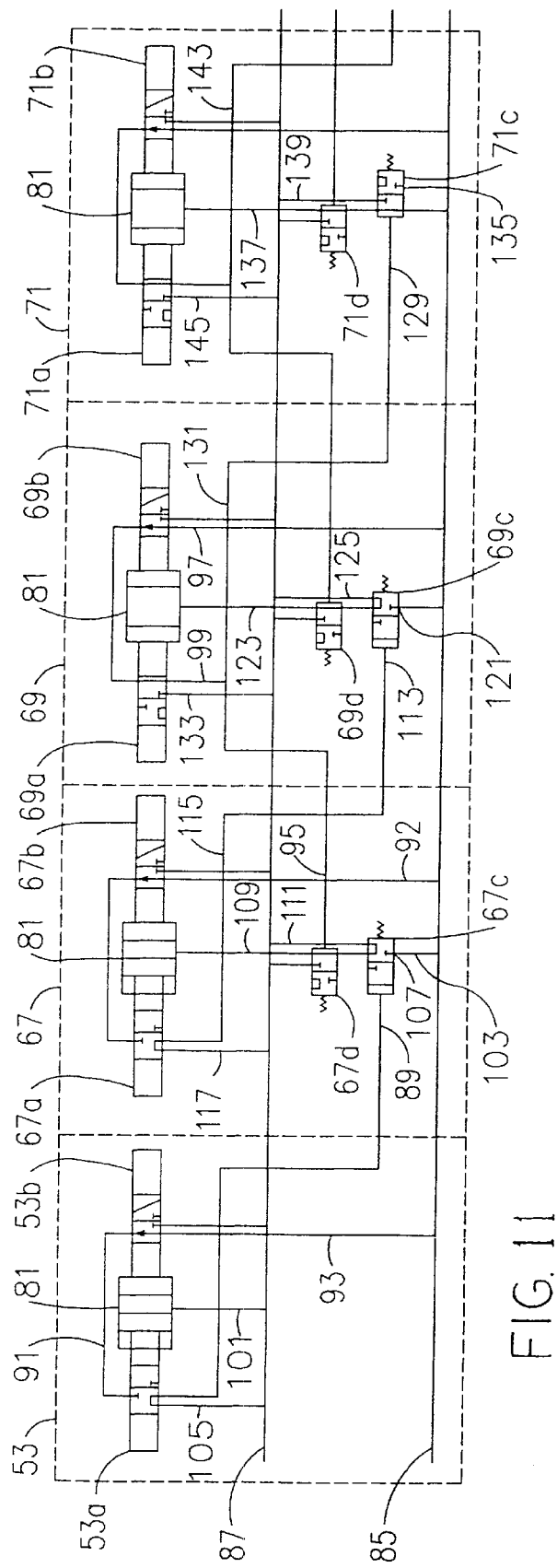

No longer pressure-biased to the position shown in FIG. 10, the first control device 69c of valve 69 is, as shown in FIG. 11, biased leftward by its spring 79. When the device 69c is in such position, the path from the pressure line 85 is blocked at the port 121 and the chamber 81 of the valve 69 is connected to the low-pressure tank line 87 via the paths 123, 125. While the spools 69a, 69b, of the valve 69 are still in their lock positions, both are now free to be urged to an unlock position by the actuator 57 since, as described above, chamber pressure (which otherwise restrained such movement) has been reduced to a low value.

Figure 12:
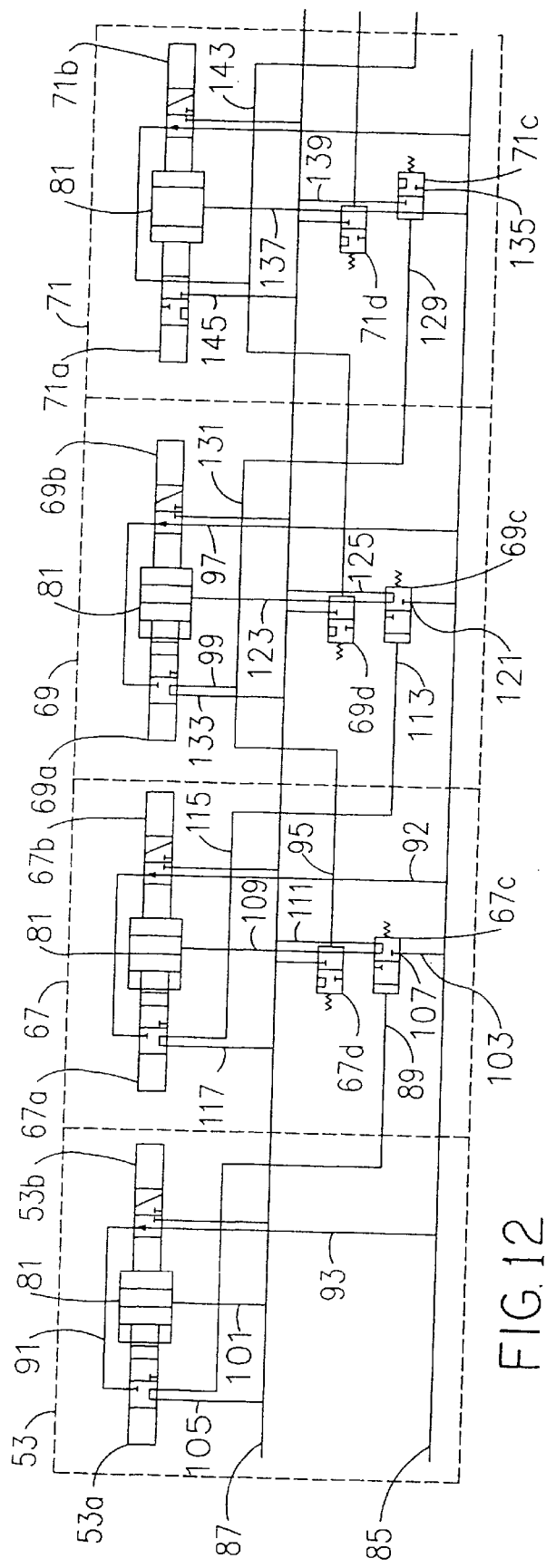

As the train 11 continues along the curved path 12, the third vehicle 13c enters the left turn and the actuator arm 57a urges the left spool 69a of the valve 69 rightwardly to its unlock position shown in FIG. 12. Therefore, the line 129 to the first control device 71c of the valve 71 is connected to the tank line 87 via the paths 131, 99 and 133.

Figure 13:
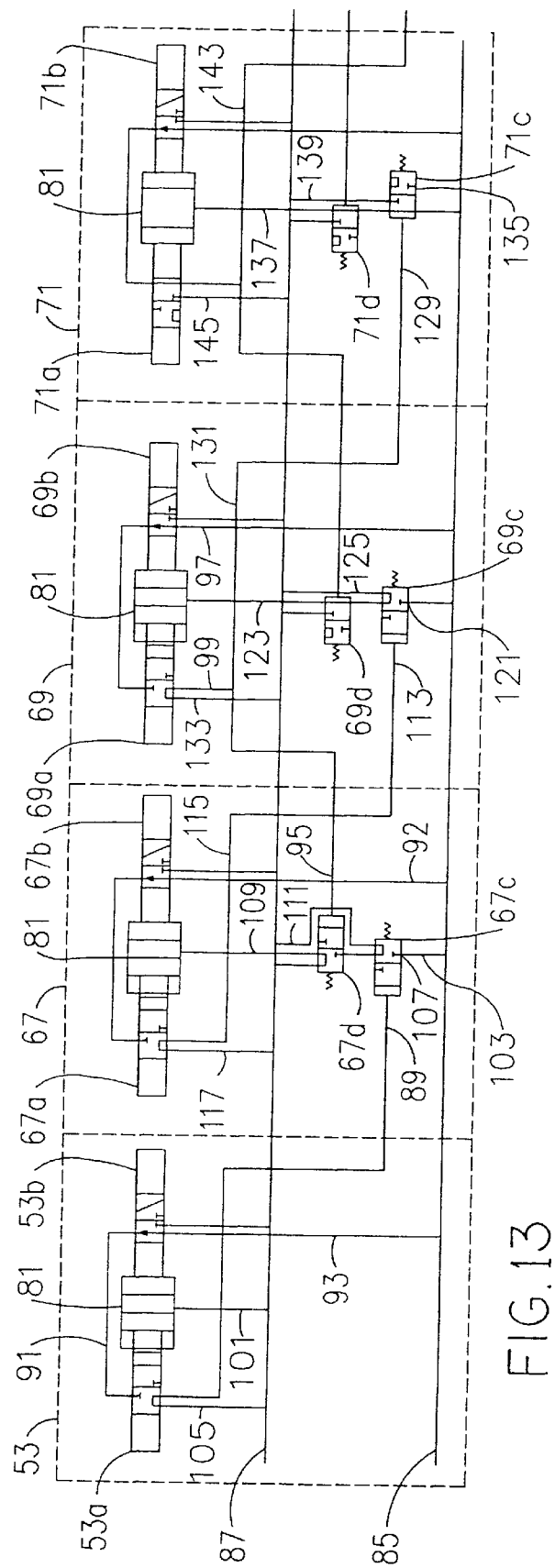

No longer pressure-biased to the position shown in FIG. 12, the second control device 67d of the valve 67 is biased rightwardly by its spring 79 to the position shown in FIG. 13. Such control device 67d "takes over" the function of the control device 67c by continuing to maintain a connection between the chamber 81 of the valve 67 and the tank line 87.

Figure 14:
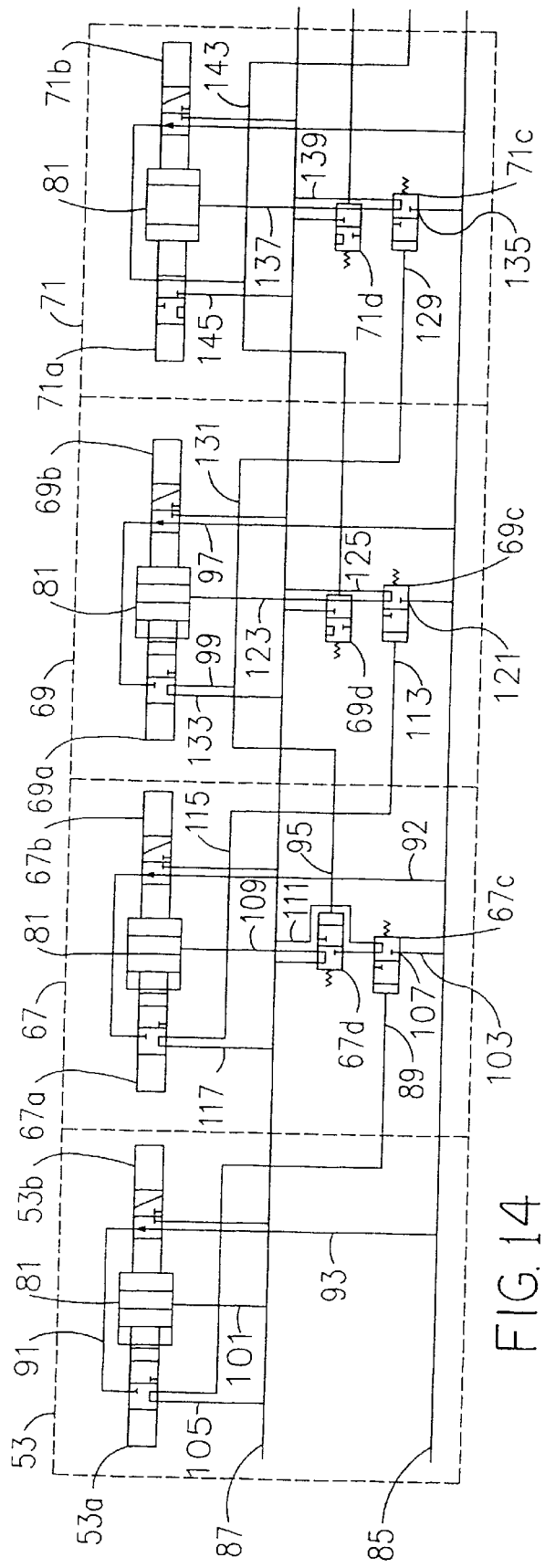

Since there is now no significant pressure on the line 129, the first control device 71c of valve 71 is biased leftwardly by its spring 79 to the position shown in FIG. 14. When the device 71c is in such position, the path from the pressure line is blocked at the port 135 and the chamber 81 of the valve 71 is connected to the low-pressure tank line 87 via the paths 137, 139. While the spools 71a, 71b of the valve 71 are still in their lock positions, both are now free to be urged to an unlock position by the actuator 59.

Figure 8:
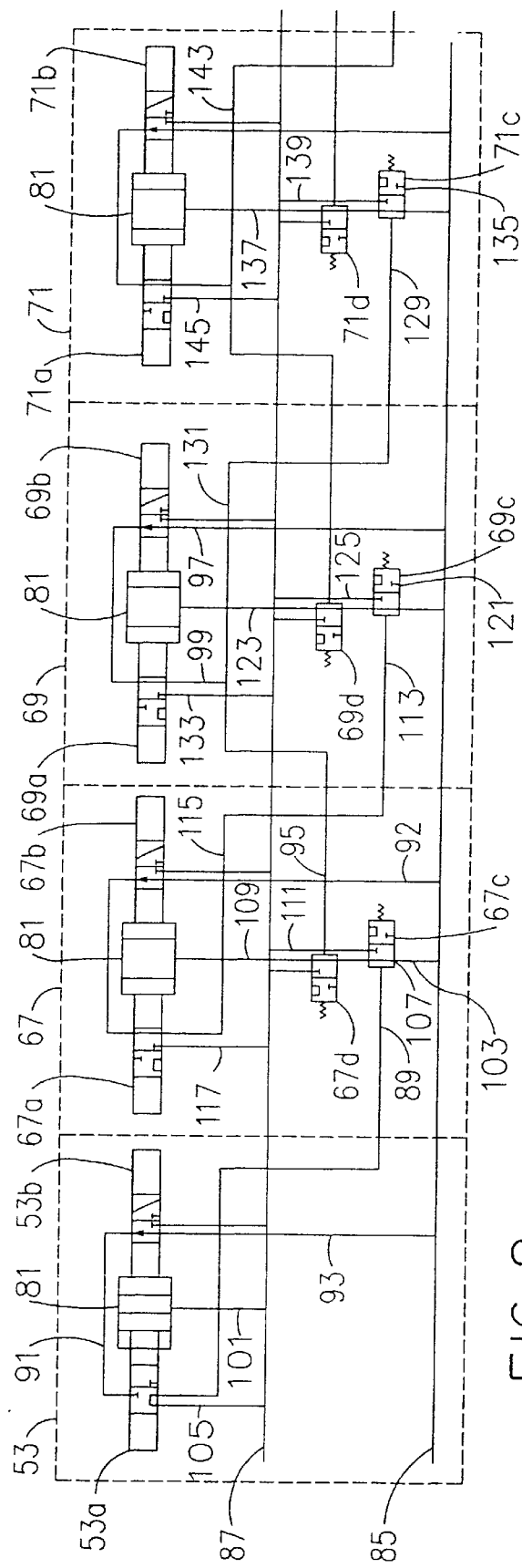

It is next assumed that two events occur substantially simultaneously or within a short time span. One event is that the fourth vehicle 13d enters the left turn. The other is that the first vehicle 13a exits such turn to the extent that its actuator 43 no longer forces the left spool 53a of the first valve 53 rightwardly to the unlock position as shown in FIG. 8.

Figure 15:
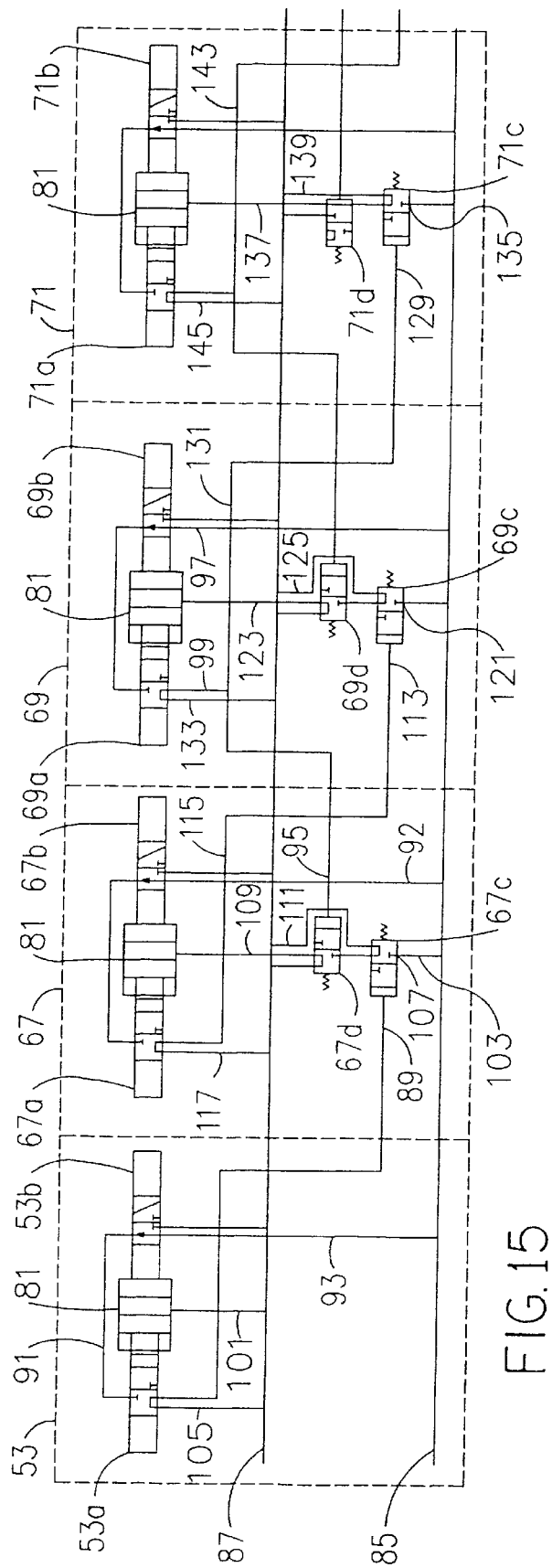

When the fourth vehicle 13d enters the left turn, the actuator arm 59a urges the left spool 71a of the valve 71 rightwardly to its unlock position shown in FIG. 15. Considering FIG. 4B also, the line 141 to the first control device 73c of the valve 73 is connected to the tank line 87 via the paths 143 and 145. The circuit 41 functions sequentially as described above for preceding vehicles 13a, 13b, 13c, actuators 53, 55, 57 and valves 53, 67, 69.

Figure 16:
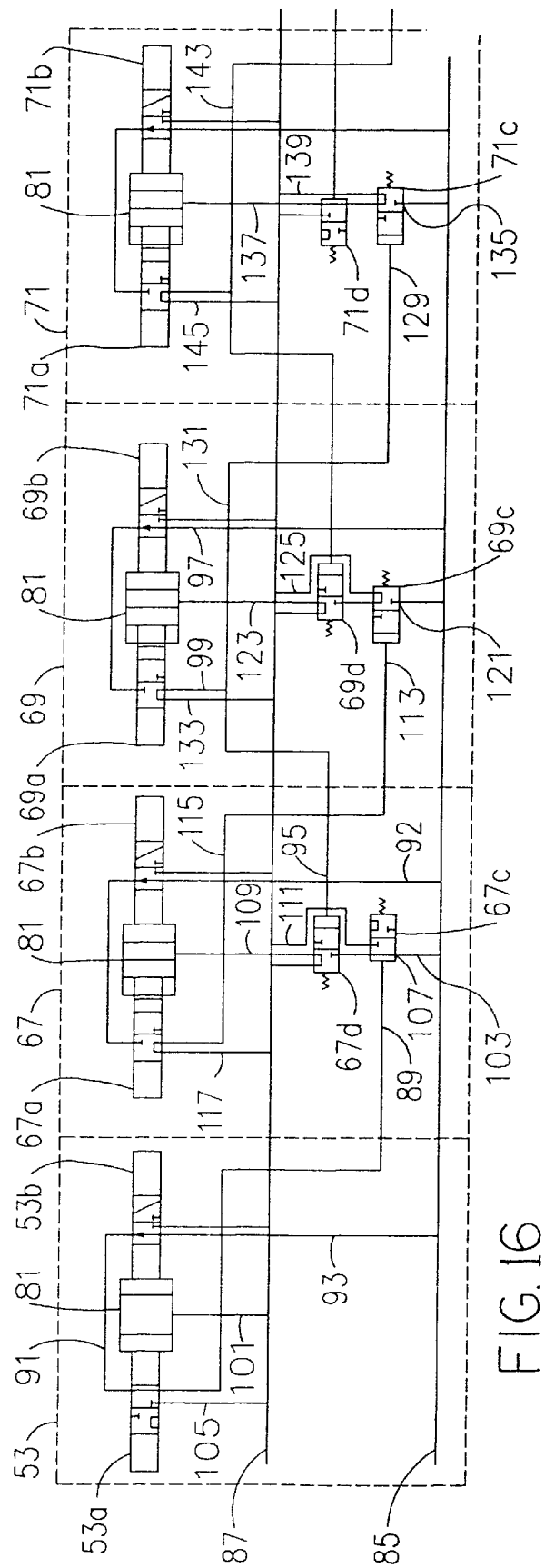

As the first vehicle 13a exits the left turn, its actuator arm 43a is no longer is forced against the left spool 53a of the first valve 53. Since the chamber 81 of such first valve 53 is at tank pressure, the left spool 53a moves leftwardly and resumes the position shown in FIGS. 4A and 16. When it does so, line 89 of the device 67c is re-connected to the pressure line 85 via paths 91, 93 and the device 67c again assumes its rightward position, also as shown in FIG. 16.

Figure 17:
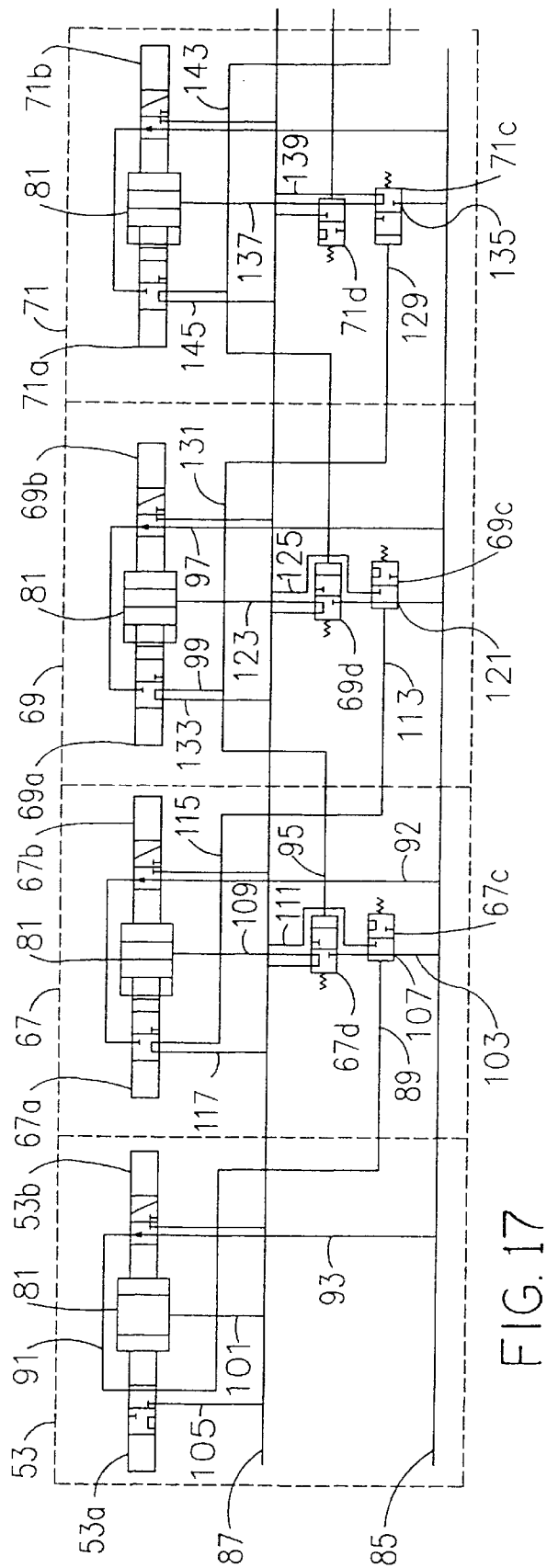

As the second vehicle 13b exits the left turn, its actuator arm 55a is no longer forced against the left spool 67a of the valve 67. And since the chamber 81 of such valve 67 is at tank pressure, such pressure urges the spool 67a leftwardly to the position shown in FIG. 17. When the spool 67a is returned to such position, line 113 of the device 69c is re-connected to the pressure line 85 via paths 115, 92 and the device 69c again assumes its rightward position, also as shown in FIG. 17.

Figure 18:
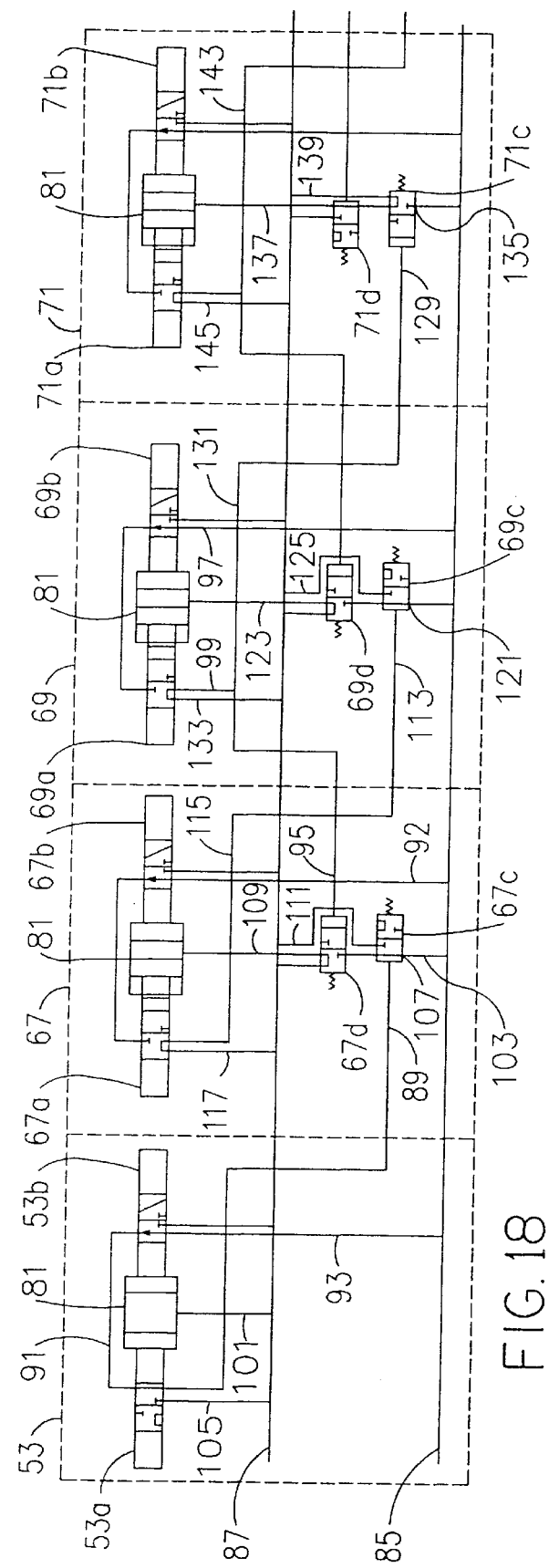

It is not until the third vehicle 13c exits the left turn and the left spool 69a of the valve 69 returns to its lock position as shown in FIG. 18 that pressure on the control line 95 for the second control device 67d of the valve 67 is re-established. Such device 67d is thereby urged to its leftward position shown in FIG. 18, the path 103 from the pressure line 85 to the chamber 81 of the valve 67 is re-established (as shown in FIGS. 7 and 8) and the left spool 67a of the valve 67 is again forcefully retained in the lock position. And considering FIG. 4B also, pressure on the control line 143 is re-established when the left spool 71a of the valve 71 is returned to its lock position.

To put it in other words, the left spool 67a of the valve 67 is pressure-restrained in its lock position (i.e., restrained there by the pressure in the pressure line 85) only when the actuator arms 43*a*, 55*a*, 57*a* are not urged against the left spools 53*a*, 67*a*, 69*a* of the valves 53, 67 and 69, respectively. And that occurs when the first, second and third vehicles 13*a*, 13*b*, 13*c* are all realigned in a straight line.

Figure 19:
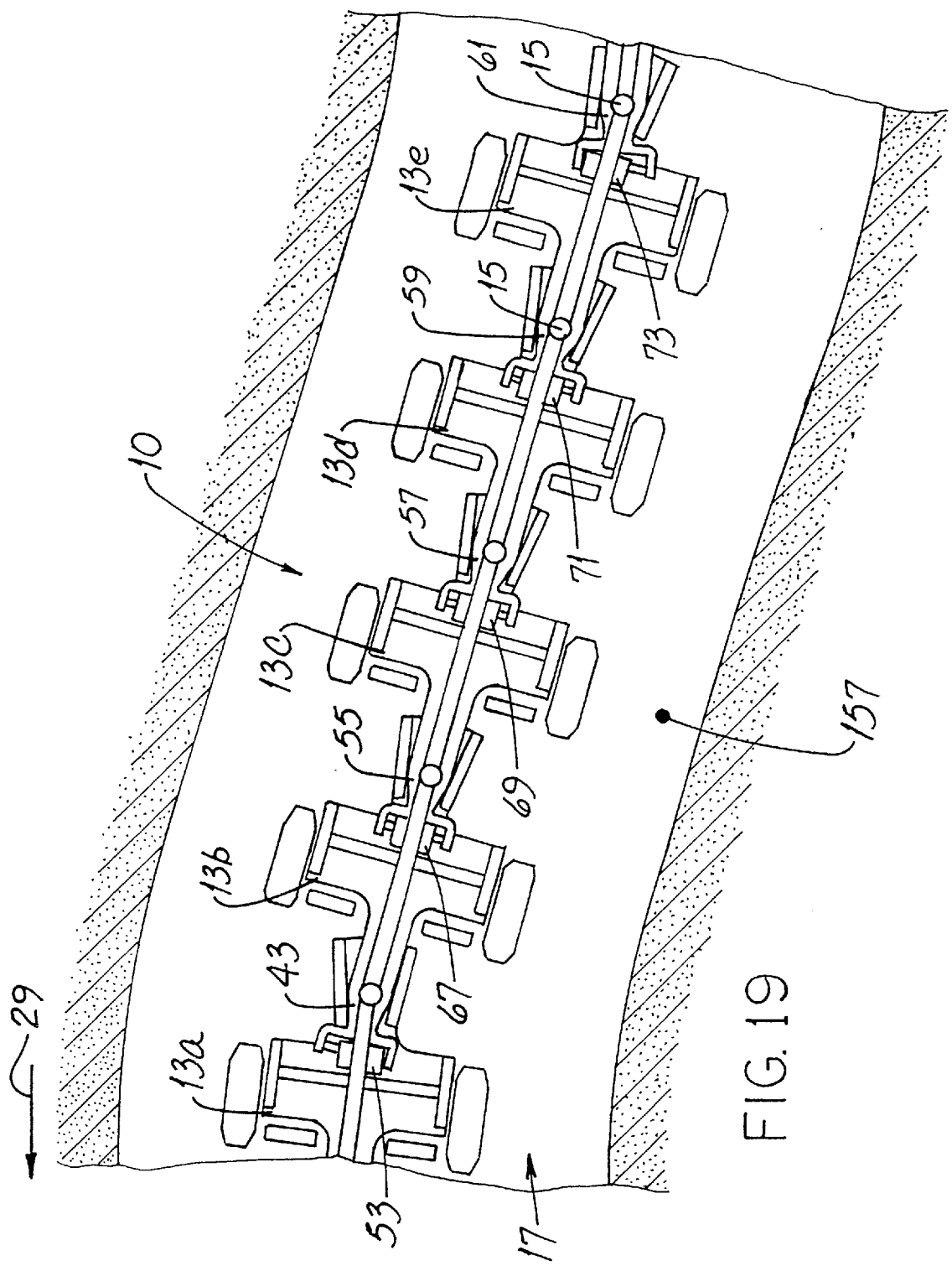
FIG. 19 is a representative top plan view of a second configuration of the train shown in FIG. 1. The conveyor belt has been omitted for clarity.

Referring next to FIG. 19, assuming that the operation of the circuit 41 is fully understood with respect to the first configuration, only a few aspects of the second configuration need be described. The difference between the first configuration shown in FIGS. 2 and 3 and the second configuration shown in FIG. 19 is that in the latter, the first through fifth valves 53, 67, 69, 71, 73, respectively, are mounted on the first through fifth vehicles 13*a* through 13*e*, respectively. The first, second, third and fourth actuators 43, 55, 57, 59, respectively, are fixed with respect to the second through fifth vehicles 13*b*, 13*c*, 13*d*, 13*e*, respectively.

In the configuration of FIG. 19 and referring also to FIGS. 4A, 4B, each of the first and second valves 53, 67, includes a respective spool 53*a*, 67*a*, mounted for movement between a lock position as shown in FIGS. 4A, 4B and an unlock position like the positions of spools 53*a* and 69*a* shown in FIG. 12. When the first valve spool 53*a* is in its lock position, the second valve spool 67*a* is pressure-retained in its lock position. And when the first valve spool 53*a* is moved to its unlock position by urging of the first actuator 43, the second valve spool 67*a* is pressure-relieved to move to its unlock position under the urging of the second actuator 55. Sequentially, the valves 53, 67, 69, 71 and so forth operate as described above.

Figure 20:
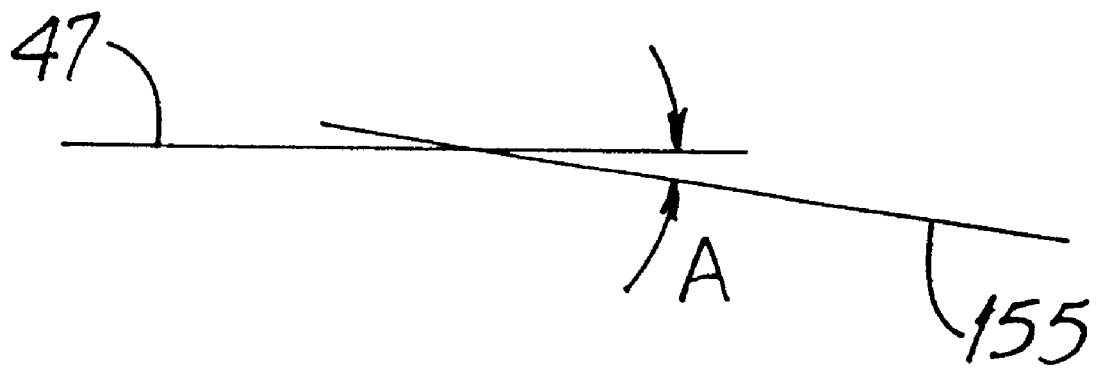
FIG. 20 is a diagram illustrating the relationship of the centerlines of two contiguous vehicles during certain aspects of train steering.

In a highly preferred articulated train 11, a spool, e.g., the left spool 53*a* of the valve 53 in FIG. 4A, is urged inwardly when the smaller included angle A (FIG. 20) between the centerlines 47 of the vehicle 13*a* and the centerline 155 of the vehicle 13*b* is in the range of 4° to 12° and an angle of about 8° is most preferred. The same range and preferred angle apply with respect to the centerlines of the other vehicles 13*b* through 13*f*.

Only a few vehicles, actuators and valves are shown in the drawings to describe how the steering system 10 operates. It is to be appreciated that n additional vehicles, actuators and valves may be employed in the train 10.

As used in this specification, the term "vehicle" means a land vehicle equipped with wheels, tracks or a combination thereof. The terms "first," "second," "third," "fourth," "nth" and "trailing," as applied to vehicles forming an articulated train, mean, respectively, those vehicles which are the first, second, third, fourth, nth and last vehicles past a fixed point 157 on the travelled way when the train 11 is travelling in a particular direction.

While the principles of the invention have been shown and described in connection with preferred embodiments, it is to be understood clearly that such embodiments are by way of example and are not limiting.

What is claimed:

1. In an articulated train including first, second, and third vehicles pivotally pinned to one another in end-to-end relationship, the improvement including:
   first means between the second and third vehicles for selectively locking the pivot between the second and third vehicles so that the second and third vehicles are secured in aligned relationship; and
   turn control means between the first and second vehicles and communicating with said first means for unlocking the first means when the first vehicle turns through a predetermined angle, said turn control means comprises a forked actuator and actuator mechanism co-acting with one another via left and right spools by movement of said actuator caused by turning of a lead vehicle.

2. The train of claim 1 wherein:
   the first means includes a first actuator fixed with respect to the second vehicle and a first actuator mechanism fixed with respect to the third vehicle and coacting with the first actuator;
   and wherein:
   the first actuator mechanism has locked and unlocked configurations; and
   the first means secures the second and third vehicles in aligned relationship when the first actuator mechanism is in its locked configuration.

3. The train of claim 2 wherein:
   the first means permits the second vehicle to pivot with respect to the third vehicle when the first actuator mechanism is in its unlocked configuration.

4. The train of claim 1 wherein:
   the first means includes a first actuator mechanism fixed with respect to the second vehicle and a first actuator fixed with respect to the third vehicle and coacting with the first actuator mechanism;
   and wherein:
   the first actuator mechanism has locked and unlocked configurations; and
   the first means secures the second and third vehicles in aligned relationship when the first actuator mechanism is in its locked configuration.

5. The train of claim 4 wherein:
   the first means permits the second vehicle to pivot with respect to the third vehicle when the first actuator mechanism is in its unlocked configuration.

6. In an articulated train including first, second, third and fourth vehicles pivotally pinned to one another in end-to-end relationship, the improvement comprising a steering system including:
   first, second and third hydraulic valves fixed with respect to the second, third and fourth vehicles, respectively;
   first, second and third forked actuators fixed with respect to the first, second and third vehicles, respectively, and positioned to coact with the first, second and third valves, respectively;
   and wherein:
   each of said valves includes a left and right spool mounted for movement between a locked and an unlocked position by movement of a respective actuator caused by a turning of a leading vehicle;
   when the left and right spools of the first valve are in its lock position, the left and right spools of the second valve are pressure-retained in its lock position; and
   when the first valve spools are moved to its unlock position by urging of the first actuator, the first valve hydraulically communicates with the second valve so that the second valve spools are pressure-relieved to move to its unlock position under the urging of the second actuator.

7. The train of claim 6 wherein:
   the third valve includes a spool mounted for movement between lock and unlock positions; and
   when the second valve spool is moved to its unlock position, the third valve spool is pressure-relieved to move to its unlock position under the urging of the third actuator.

8. The train of claim 7 wherein:

the steering system includes a pressure line common to the first, second and third valves;

each of the valves includes a respective chamber in pressure communication with its valve spool; and when the first valve spool is in its lock position, the chamber of the second valve is connected to the pressure line.

9. The train of claim 8 wherein:

the steering system includes a tank line common to the first, second and third valves; and when the first valve spool is in its unlock position, the chamber of the second valve is connected to the tank line.

10. The train of claim 6 wherein:

the steering system includes a pressure line common to the first, second and third valves;

each of the valves includes a respective chamber in pressure communication with its valve spool;

the second and third valves each include a respective control device; and the second valve spool is pressure-retained in its lock position by a connection from the pressure line through the control device of the second valve to the chamber of the second valve.

11. The train of claim 10 wherein:

the third valve spool is pressure-retained in its lock position by a connection from the pressure line through the control device of the third valve to the chamber of the third valve.

12. The train of claim 6 wherein:

the steering system includes a pressure line;

each of the second and third valves includes a control device which is pressure-biased to a first position and spring-biased to a second position; and when the control device of the second valve is in its first position, the second valve spool is pressure-retained in its lock position by a connection from the pressure line through the control device of the second valve to the chamber of the second valve.

13. The train of claim 12 wherein:

when the control device of the second valve is in its second position, the second valve spool is pressure-relieved to move to its unlock position under the urging of the second actuator.

14. The train of claim 13 wherein:

the control device of the second valve is pressure-biased to its first position when the first valve spool is in its lock position.

15. The train of claim 13 wherein:

the control device of the second valve is spring-biased to its second position when the first valve spool is in its unlock position.

16. A method for steering an articulated a train including first, second, third and fourth vehicles pivotally pinned to one another in end to-end relationship, the method comprising the steps of:

providing first, second and third hydraulic valves fixed with respect to the second, third and fourth vehicles, respectively, each of said valves include a left and right spool in a lock position and mounted for movement to an unlock position;

providing first, second and third forked actuators fixed with respect to the first, second and third vehicles, respectively, and positioned to coact with the first, second and third valves, respectively;

steering the first vehicle into a turn;

urging the first actuator against the left or right spool of the first valve, thereby moving the left and right spools of the first valve to its unlock position; and hydraulically communicating the first valve with the second valve in order to pressure-relieve the second valve spool.

17. The method of claim 16 wherein:

the second valve includes a control device mounted for movement between a first pressure-biased position and a second spring-biased position;

and wherein:

the pressure-relieving step includes moving the control device to the second spring-biased position.

* * * * *